(12) United States Patent
Gaudl

(10) Patent No.: US 7,923,531 B2
(45) Date of Patent: *Apr. 12, 2011

(54) ACRYLATED MALEIC-MODIFIED ROSIN ESTER AND METHOD OF PREPARATION

(75) Inventor: Kai-Uwe Gaudl, Woodridge, NJ (US)

(73) Assignee: Sun Chemical Corporation, Parsippany, NJ (US)

( * ) Notice: Subject to any disclaimer, the term of this patent is extended or adjusted under 35 U.S.C. 154(b) by 726 days.

This patent is subject to a terminal disclaimer.

(21) Appl. No.: 11/761,788

(22) Filed: Jun. 12, 2007

(65) Prior Publication Data

US 2007/0232786 A1    Oct. 4, 2007

Related U.S. Application Data

(60) Continuation of application No. 10/413,975, filed on Apr. 15, 2003, now abandoned, which is a division of application No. 09/755,450, filed on Jan. 5, 2001, now Pat. No. 6,583,263.

(51) Int. Cl.
*C09F 7/10* (2006.01)

(52) U.S. Cl. ......................... 530/232; 530/215; 530/210

(58) Field of Classification Search .................. 530/200, 530/232

See application file for complete search history.

(56) References Cited

U.S. PATENT DOCUMENTS

| 4,035,320 A | 7/1977 | Lawson |
| 4,759,868 A | 7/1988 | Clarke et al. |
| 4,812,508 A | 3/1989 | Makhlouf et al. |

FOREIGN PATENT DOCUMENTS

| JP | 59-59760 | 4/1984 |
| JP | 2-51516 | 2/1990 |
| JP | 2-248481 | 10/1990 |
| WO | WO-87/04448 | 7/1987 |

*Primary Examiner* — James Seidleck
*Assistant Examiner* — Saira Haider
(74) *Attorney, Agent, or Firm* — Dickstein Shapiro LLP

(57) ABSTRACT

A two-step method for introducing acrylic functions into high molecular weight natural resins, under mild conditions, without the risk of gellation, wherein an acrylated natural resin ester is prepared by esterifying one or more of the sterically hindered hydroxy groups of the natural resin ester in an inert solvent with a 3-halopropionic acid, to form a 3-halopropionate ester of the natural resin ester and dehydrohalogenated the 3-halopropionate ester by reacting it with an organic base.

20 Claims, No Drawings

ACRYLATED MALEIC-MODIFIED ROSIN ESTER AND METHOD OF PREPARATION

This application is a continuation of application Ser. No. 10/413,975, filed Apr. 15, 2003, and now abandoned, which was a division of application Ser. No. 09/755,450, filed Jan. 5, 2001 and now U.S. Pat. No. 6,583,263.

BACKGROUND OF THE INVENTION

1. Field of the Invention

This invention relates to energy curable resin compositions used to formulate energy curable printing inks. More particularly, the invention relates to energy curable printing inks containing acrylated rosin and methods for preparing the rosin.

2. Description of Related Art

Resins, derived from natural products such as rosin esters are widely used as printing-ink vehicles in flexographic and gravure printing inks. Maleic modified rosin-esters exhibit good pigment wetting, gloss retention, color retention and adhesion. Typically these esters are prepared from rosin, maleic anhydride and polyols, such as glycerol or pentaerythritol. In order to render these materials energy curable, acrylic groups are attached to free hydroxyl groups of the rosin ester. Since these hydroxyl groups are sterically hindered due to the bulky rosin moieties, the acrylation with acrylic acid is difficult, due to severe reaction conditions necessary. Often these severe reaction conditions cause undesired polymerization of the acrylic functions at high temperatures due to their thermal instability. Therefore, an introduction of acrylic groups under mild conditions is required.

WO 87/04448 describes the esterification of fumarated rosin esters with hydroxyethyl acrylate at high temperatures above 200° C. At such temperatures there is a high risk of polymerization of acrylated functions even in the presence of an inhibitor.

U.S. Pat. No. 4,035,320 describes the reaction of special rosin esters, prepared with a large excess of polyols, along with acrylic acid. According to the nature of the described special rosin esters the acrylated compositions exhibit a mixture of low levels of acrylated rosin-esters and free acrylated polyols. However, the high excess of remaining hydroxyl functions after the reaction can affect the properties of the ink, since greater number of hydroxyl often give poor lithographic performance properties. To compensate for this the patent discloses that the free hydroxyl groups are capped by an additional reaction with acetic anhydride.

There continues, however, to be a need for methods to efficiently produce acrylated rosin esters, wherein the acrylate groups are connected directly to the rosin ester, and are free of excess hydroxy groups and polymerized acrylate groups and wherein gellation, which can occur as a result of only partial polymerization during synthesis, is avoided.

SUMMARY OF THE INVENTION

The above described need is met by this invention, which is a method for preparing acrylated natural resin esters comprising: (a) esterifying one or more sterically hindered hydroxy groups of a natural resin ester, with 3-halopropionic acid at an esterification temperature of about 100° C. in an inert solvent to form a 3-halopropionate ester of the natural resin ester; (b) reacting the 3-halopropionate ester with an organic base at a reaction temperature of no more than about 100° C. thereby forming an acrylated natural resin ester that is free of polymerized acrylate groups and optionally free of excess hydroxy groups.

An added embodiment of this invention is an acrylated maleic-modified rosin ester comprising a maleic-modified rosin ester moiety and one or more acrylate moieties directly connected to the maleic-modified rosin ester moiety through an ester linkage; and optionally, one or more hydroxy moieties; wherein the acrylated maleic-modified rosin ester contains about 30 equivalent % or more of the acrylate moieties based on the total equivalents of the acrylate moieties and hydroxy moieties and is substantially free of polymerized acrylate moieties.

Preferably the acrylated maleic-modified rosin ester contains about 40 equivalent % to about 75 equivalent % of the acrylate moieties based on the total equivalents of the acrylate moieties and the hydroxy moieties.

DETAILED DESCRIPTION OF THE INVENTION

This invention provides a method for introducing acrylic functions into high molecular weight natural resins, such as rosin esters, under mild conditions, without the risk of gellation during the preparation. In particular, an acrylated natural resin ester is prepared by the invention by first esterifying one or more sterically hindered hydroxy groups of a natural resin ester, with a 3-halopropionic acid, such as 3-chloropropionic acid, at an esterification temperature of about 100° C. to form a 3-halopropionate ester of the natural resin ester. Next, the 3-halopropionate ester is dehydrohalogenated by reacting with an organic base at a reaction temperature of no more than about 100° C. form the acrylated natural resin ester.

By the method of this invention, it was found, that roughly about 34 times more water is generated during the esterification with 3-chloropropionic acid than by direct esterification with acrylic acid. This finding indicates that a higher degree of esterification is achieved by using 3-chloropropionic acid instead of an acrylic acid and further illustrates the high efficiency of esterifying strong sterically hindered hydroxyl functions in natural resins in contrast to typical esterification methods using acrylic acid. Since the subsequent dehydrohalogenation of the esterified product proceeds at mild conditions, (i.e. at a temperature of no more than about 100° C.) preferably at 25-80° C., there is low risk of forming uncontrolled polymerization products (i.e. gelling). Therefore, strong sterically hindered hydroxyl functions in natural resins can be more efficiently acrylated by the two step method of the present invention, than with the direct acrylation natural resins with acrylic acid as taught in the prior art.

The first step of the present two-step method comprises the esterification of a natural resin ester containing one or more sterically hindered hydroxy groups, with a 3-halopropionic acid at an esterification temperature of about 100° C. to form a 3-halopropionate ester of the natural resin ester.

Natural resin esters containing sterically hindered hydroxy groups, which may be used in the method of this invention, include rosin esters of polyols, maleated rosin esters of polyols, fumarated rosin esters, phenolic rosin esters. As used herein the term "polyol" is intended to include difunctional, trifunctional, tetrafunctional or polyfunctional hydroxy compounds such as ethylene glycol, propylene glycol, neopentyl glycol, 2-ethyl-2-butyl propanediol, polyethylene glycol, polypropylene glycol, glycerol, trimethylol ethane, trimethylol propane, trimethylol butane, pentaerythritol, dipentaerythritol, sorbitol, or a combination thereof, of which glycerol and pentaerythritol are preferred. Other natural resins derivatives, having sterically hindered hydroxyl groups, may also be used in the method of this invention such as for example derivatives of shellac, starch and dextrine. Of the natural resin esters, rosin esters are preferred, and maleated rosin esters are particularly preferred.

Rosin esters may be synthesized from commercial rosin such as China gum-rosin, along with trifunctional or tetrafunctional hydroxy compounds such as glycerol, pentaerythritol, and the like. Esters of rosin are commercially available and may be prepared as described in the "Printing Ink Manual", Fifth Edition, Blueprint, London. The preparation of maleated rosin ester is specifically described in Example 1, which follows hereinafter.

The 3-halopropionic acids, which may be used in the method of this invention, may be 3-fluoropropionic acid; 3-chloropropionic acid; 3-bromopropionic acid; 3-iodopropionic acid; or a combination thereof. Preferably, the 3-halopropionic acids is 3-chloropropionic acid. The method of this invention is described hereinafter using 3-chloropropionic acid to esterify rosin esters or maleated resin esters, but the invention is not intended to be limited thereby.

The esterification of the rosin esters with 3-Chloropropionic acid may be carried out by heating the 3-chloropropionic acid with the rosin esters, and optionally an acidic catalyst, in an inert solvent, which later forms an azeotrope with water.

Suitable solvents are aliphatic and aromatic hydrocarbons such as Solvesso 100, naphta, octane, nonane, decane high boiling petrol ethers, toluene, xylenes preferable xylene; and ketones such as methyl isobutyl ketone, diisoamyl ketone, diisopropyl ketone. Preferably the ketone solvent is diisobutyl ketone.

As previously mentioned, the reaction can be carried out with or without acidic catalysts. When employed, suitable acidic catalysts are strong organic acids as p-toluene sulfonic acid or inorganic acids such as sulfuric acid. The acid catalyst is added in amounts of about 0.01 to about 5 wt. % based on the weight of the rosin ester.

The reactants are mixed in a ratio of (e.g., OH groups) to (e.g. COOH groups) ranging from 2:1 to 1:2; preferably the equivalent ratio is about 1:1. The esterification temperature, which is restricted by the boiling point of the inert solvent, typically may be about 100° C. to about 180° C. preferably the esterification temperature is between about 130° C. and 160° C.

The water, which is formed during the synthesis is separated by azeotropic distillation with the inert solvent and removed. The equivalents of the water formed is an accurate indicator of the efficiency of the esterification reaction. Since the esterification of sterically hindered hydroxy groups with 3-chloropropionic acid proceeds efficiently, it is possible to specify the number of hydroxy groups to be esterified so that modified rosin esters can be produced which are either exhaustively esterified to selectively achieve only chloropropionate ester groups, or partially esterified to provide a desired proportion of chloropropionate ester groups and sterically hindered hydroxy groups.

The extent of the esterification can be determined by the amount of 3-halopropionic acid which has reacted with the hydroxyl groups in the natural resin ester. Since one mole of water is generated for every mole of reacted acid, the extent of esterification can be expressed by the moles of water generated and collected, divided by the moles of 3-halopropionic acid, initially charged. Thus the Extent of Esterification (%)= ((moles water)/(moles 3-halopropionic acid))×100. The degree of esterification, achieved with the invention, is significantly higher than the degree of direct esterification achieved by acrylic acid. In particular, the degree of esterification (expressed as a percentage) achieved with the present method is about 30% or more, and typically the degree of esterification is about 30 to about 90%. Preferably, the degree of esterification is about 40% to about 75% as illustrated in the following examples. By contrast, the degree of esterification achieved by the direct esterification of the same rosin ester with acrylic acid, is less than 15% and typically is about 14% or less as illustrated in the following comparative example and requires a greater amount of catalyst in achieving an even lower degree of esterification.

After esterification with 3-chloropropionic acid, the esterified rosin ester is reacted with an organic base, such as a tertiary amine for example trimethylamine, triethylamine, tributylamine, triethanolamine, N,N-dimethylbenzyl amine, diazabicycloundecene. A preferred organic base is triethylamine. The organic base is used in a molar ratio n is 1 to 1.2.

The second step in the method of this invention involves dehydrohalogenating the 3-chloroproprionate ester moieties of the esterified rosin ester in the presence of an organic base, under conditions which substantially obviate polymerization of the formed acrylate moieties. To reduce the chance of premature polymerization, the dehydrohalogenation reaction temperature is maintained below 100° C. with a typical range being 0° C. to about 100° C. Preferably the reaction temperature is between about 25° C. and about 80° C.

After the reaction, the formed ammonium-salt, which is insoluble in the solvent, is separated by filtration or by washing with an appropriate polar solvent, for example methanol or water, with water being preferred. Analytical experiments show, by determination of the amount of separated ammonium salt or infrared spectroscopy that the dehydrohalogenation proceeds completely.

The product may also be further purified by washing to remove trace amounts of acrylic acid, which may form from unreacted 3-halopropionic acid. The product may then be isolated by evaporation of the organic solvent.

In addition to the use of a low reaction temperature, the dehydrohalogenation reaction may be carried out in the presence of a free radical polymerization inhibitor. Thus, the dehydrohalogenation reaction may be carried out in the presence of air or a chemical polymerization inhibitor such as hydroquinone, hydroquinone monomethyl ether, tert.-butyl catechol, pheneothiazine and similar conventional polymerization inhibitors.

In the method of this invention, the 3-chloropropionate ester of the rosin ester intermediate may be synthesized and isolated. Then the isolated intermediate is later dehydrohalogenated in a separate reaction vessel. Alternatively, a preferred method of preparation is to carry out the reaction as a one-pot synthesis, in which no intermediate is isolated and steps 1 and 2 are performed successively in-situ.

The acrylated rosin ester product of this invention may be tested for polymerization and/or crosslinking of acrylate groups by any conventional method.

In one test method, the dilution of the acrylated rosin ester product in various organic solvents, such as ketones or alcohols, did not give any signs of crosslinked material, which would be an indication for undesired premature polymerization of the acrylic double bonds. Such crosslinked materials do not dissolve in common organic solvents and tend to precipitate upon dilution far before the cloud-point of the resin is reached, or they form gels.

In another test method, rheological experiments (flow, creep and oscillation measurements) on the cone and plate rheometer AR 1000 (available from TA Instruments) may be carried out to determine whether a gel is formed which would indicate a partial polymerization of the acrylic functions in the product. Such rheological experiments on the acrylated rosin ester produced by the method of this invention provided no evidence, that a gel is formed, confirming that the acrylated rosin ester of this invention is substantially free of polymerized acrylate groups.

As noted previously, the major advantage of the two-step acrylation method described in this invention is that, it is possible to introduce much more acrylic groups to the natural resin than is possible with the standard direct acrylation method using acrylic acid. The highly efficient acrylation of this invention is of particular interest for making an energy curable printing ink. As used herein the term "energy curable" is intended to include compositions which are cured with ultraviolet radiation, high energy electron radiation, or a combination thereof. Typically, the higher the amount of energy-curable acrylic functions in the product, the higher the crosslinking density after curing, and the faster the curing speed. This higher amount of acrylic functions provides two major impacts. A higher crosslinking density in general improves the performance (solvent resistance, mechanical properties) as well as the appearance (gloss) of a printing ink. In addition, faster cure allows a higher production speed of the printing press offering a distinct economical advantage.

Furthermore, the 3-chloropropionate esters may be readily tailored or designed to have a desired number of 3-chloropropionate ester groups and sterically hindered hydroxy groups. Since the second step of the method efficiently converts the 3-chloropropionate ester groups to acrylate ester groups under conditions which substantially precludes polymerization, acrylated rosin esters are produced which have the desired number of acrylate ester groups and sterically hindered hydroxy groups to meet the requirements for a specific application such as a printing ink. Thus, the acrylated rosin ester may contain only acrylate ester groups or it may, by design, also contain residual functional hydroxy groups to enhance properties of the acrylated rosin ester, such as adhesion to various substrates and solubility in different polar solvents, as for examples alcohols. Preferably the acrylated rosin ester contains about 40 equivalent % or more of acrylate groups based on the total equivalents of acrylate groups and hydroxy groups. Regardless of the extent of esterification, the acrylated rosin esters produced by this invention are substantially free of polymerized acrylate moieties. A preferred acrylated rosin ester is an acrylated maleic-modified rosin ester, which is substantially free of polymerized acrylate moieties and which contains a maleic-modified rosin ester moiety and one or more acrylate moieties directly connected to the maleic-modified rosin ester may additionally contain sterically hindered hydroxy groups.

Specific aspects of the present invention are disclosed in even greater detail in the following examples. The examples are illustrative only, and are not intended to limit the scope thereof in any respect. All parts and percentages provided are in weight percent unless otherwise noted.

Example 1

Synthesis of Rosin Esters 693 g of Gum-Rosin stirred under nitrogen for 90 minutes at a temperature of 180° C. Then, 63.0 g of maleic anhydride (available from Huntsman) was added. The temperature was maintained at 180° C. for 15 minutes, then raised to 215° C. and stirred at that temperature for 1 hour. Then, a mixture of 144.0 g of pentaerythritol and 0.60 g of magnesium oxide (Aldrich) was added in small portions. After the addition was complete, the temperature was raised to 260 to 270° C. and the reaction mixture was stirred until the acid value decreased to 30 mg KOH/g.

Example 2

318.0 g of rosin ester prepared as described in Example 1, was dissolved in 300.0 g of xylene and the solution was saturated with air. 150.0 g of 3-chloropropionic acid, 6.0 g of p-toluene sulfonic acid and 3.0 g of hydroquinone monomethyl ether (MeHQ) were added and the mixture was stirred under reflux for 2 hours. 12.1 ml of water, which was formed during the reaction, was separated by azeotropic distillation. Then, the mixture was allowed to cool down to room temperature and washed with water and bicarbonate solution. The resulting organic layer was separated and treated with 180.0 g of triethylamine, dissolved in 120.0 g of xylene. The mixture was then heated to 80° C. for 4 hours and allowed to cool down to room temperature and the precipitated triethylamine hydrochloride was filtered off with suction. The solvent was distilled off at 60° C. The acid value was 27 mg KOH/g. The extent of esterification (0.672 mole of separated water/1.388 moles of 3-chloropropionic acid)×100 was 48.38%.

Example 3

318.0 g of rosin ester, prepared as described in Example 1, was dissolved in 300.0 g of xylene and the solution was saturated with air. 75.0 g of 3-chloropropionic acid, 4.8 g of p-toluene sulfonic acid and 0.4 g of MeHQ were added and the mixture was stirred under reflux for 3 hours. 9.0 ml of water, which was formed during the reaction, was separated by azeotropic distillation. Then, the mixture was allowed to cool down to 70° C. and 80.0 g of triethylamine dissolved in 100.0 g of xylene were added. The mixture was then heated to 75° C. for 3 hours and allowed to cool down to room temperature and the precipitated triethylamine hydrochloride was filtered off with suction. The solvent was distilled off at 50° C. The acid value was 37 mg KOH/g. The extent of esterification (0.50 mole of separated water/0.694 mole of 3-chloropropionic acid)×100 was 72.05%.

Example 4

106.0 g of rosin ester, prepared as described in Example 1, was dissolved in 140.0 g of xylene and the solution was saturated with air. 50.0 g of 3-chloropropionic acid, 1.9 g of p-toluene sulfonic acid and 1.0 g of MeHQ were added and the mixture was stirred under reflux for 1 hour. 3.5 ml of water, which was formed during the reaction, was separated by azeotropic distillation. Then the temperature was lowered to 70° C. and 60.0 g of triethylamine was poured into the mixture. The mixture was allowed to stir at 70° C. for 4 hours. The mixture was allowed to cool down over night and the precipitated triethylamine hydrochloride was filtered off with suction. The reaction mixture washed with 500 ml of water and the organic layer was separated. The solvent was distilled off at 60° C. The acid value was 22 mg KOH/g. The extent of esterification (0.194 mole of separated water/0.463 mole of 3-chloropropionic acid)×100 was 41.90%.

Example 5

209 g of rosin ester, prepared as described in Example 1, was dissolved in 200 g of toluene and the solution was saturated with air. 50.0 g of 3-chloropropionic acid and 3.1 g of p-toluene sulfonic acid were added and the mixture was stirred under reflux for 3 hours. 5.0 ml of water, which was formed during the reaction, was separated by azeotropic distillation. Then, the temperature was lowered to 70° C. and 50.0 g of triethylamine was dropped into the mixture within 10 minutes. The mixture was allowed to stir at 80° C. for 3 hours. Then another 20.0 g of triethylamine was added and the mixture was stirred for another 2 hours at 80° C. The mixture was allowed to cool down over night and the precipitated triethylamine hydrochloride was filtered off with suction. The solvent was distilled off at 50° C. The acid value was 35 mg KOH/g. The extent of esterification (0.277 mole of separated water/0.462 mole of 3-chloropropionic acid)×100 was 59.82%.

Example 6

Comparative Example 97.0 g of rosin ester prepared as described in Example 1 was dissolved in 250.0 g of toluene and the solution was saturated with air. 28.0 g of acrylic acid, 5.0 g of p-toluene sulfonic acid and 0.5 g of MeHQ were added and the mixture was stirred under reflux for 2 hours. After 2 hours the formation of water stopped. 1 ml of water, which was formed during the reaction, was separated by azeotropic distillation. Then the acidic catalyst was neutralized with sodium hydroxide and the product washed with two portions 250 ml of water. The resulting organic layer was separated and the solvent was evaporated. The extent of esterification (0.055 mole of separated water/0.388 moles of acrylic acid)×100 was 14.1%.

The degree of esterification achieved in Examples 2 to 5 (found to be about 42 to 72%) was significantly higher than the degree of esterification (14%) obtained by the direct esterification with acrylic acid in Comparative Example 6. Moreover, a significantly higher degree of esterification as achieved in Examples 2 to 5 despite the amount of catalyst employed to promote esterification in Comparative Example 6 was higher than that used in Examples 2 to 5.

Example 7

One-Pot Synthesis 413.0 g of rosin ester, prepared according to Example 1, 3900 g of xylene, 100.0 g of 3-chloropropionic acid, 6.2 g of p-toluene sulfonic acid and 0.5 g of hydroquinone monomethyl ether (MeHQ). The mixture was sparged with air (0.3/minute) and heated under reflux for 4 hours. 11.2 ml of water was collected and the temperature was lowered to 70° C. Next, 105.0 g of triethylamine, dissolved in 100.0 g of xylene, was added within 5 minutes and the mixture was stirred for another 3 hours at 70° C. The mixture was then cooled to room temperature, filtered and the solvent was evaporated at 60° C. (29 inch Hg). The product had an acid value of 32 mg KOH/g. The extent of esterification (0.62 mole of separated water/0.92 mole of 3-chloropropionic acid)×100 was 67.39%.

Those skilled in the art having the benefit of the teachings of the present invention as hereinabove set forth, can effect numerous modifications thereto. These modifications are to be construed as being encompassed within the scope of the present invention as set forth in the appended claims.

What is claimed is:

1. An acrylated maleic-modified rosin ester comprising: a maleic-modified rosin ester moiety and one or more acrylate moieties connected directly to the maleic-modified rosin ester moiety through an ester linkage; and, optionally, one or more hydroxy moieties; wherein a degree of esterification with regard to said ester linkage in the acrylated maleic-modified rosin ester is about 30 equivalent % or more and the acrylated maleic-modified rosin ester is substantially free of polymerized acrylate moieties.

2. The acrylated maleic-modified rosin ester of claim 1, wherein said degree of esterification is about 40 equivalent % to about 75 equivalent %.

3. An acrylated maleic-modified rosin ester composition substantially free of polymerized acrylate moieties and made by the process comprising the steps of:
   A: esterifying one or more sterically hindered hydroxy groups of a maleic-modified rosin ester with 3-halopropionic acid at an esterification temperature of about 100° C. or more to form a 3-halopropionate ester of the maleic-modified rosin ester having a degree of esterification of about 30 equivalent % or more, calculated by dividing the moles of water generated by the moles of 3-haloproprionic acid;
   B: reacting the 3-halopropionate ester with an organic base at a second reaction temperature of about 100° C. or less to form the acrylated maleic-modified rosin ester substantially free of polymerized acrylate moieties.

4. The composition of claim 3 wherein the degree of esterification in Step A is between about 40 equivalent % and 75 equivalent %.

5. The composition of claim 3 wherein the maleated rosin ester is a reaction product of rosin, maleic anhydride, and a polyol.

6. The composition of claim 5 wherein the 3-halopropionic acid is 3-chloropropionic acid.

7. The composition of claim 6 wherein the esterification temperature is about 100° C. to about 180° C., and the second reaction temperature is between about 25° C. to about 80° C.

8. The composition of claim 7, wherein the polyol is ethylene glycol, propylene glycol, neopentyl glycol, 2-ethyl-2-butyl propanediol, polyethylene glycol, polypropylene glycol, glycerol, trimethylol ethane, trimethylol propane, trimethylol butane, pentaerythritol, dipentaerythritol, sorbitol, or a mixture thereof, and the organic base is a tertiary amine selected from a group consisting of trimethylamine, triethyl amine, tributylamine, triethanolamine, N,N-dimethylbenzylamine, and diazabicycloundecene.

9. The composition of claim 8 wherein the degree of esterification in Step A is between about 40 equivalent % and 75 equivalent %.

10. The composition of claim 5, wherein the polyol is ethylene glycol, propylene glycol, neopentyl glycol, 2-ethyl-2-butyl propanediol, polyethylene glycol, polypropylene glycol, glycerol, trimethylol ethane, trimethylol propane, trimethylol butane, pentaerythritol, dipentaerythritol, sorbitol, or a mixture thereof.

11. The composition of claim 3 wherein the 3-halopropionic acid is 3-chloropropionic acid.

12. The composition of claim 3 wherein the organic base is a tertiary amine selected from a group consisting of trimethylamine, triethyl amine, tributylamine, triethanolamine, N,N-dimethylbenzylamine, and diazabicycloundecene.

13. The composition of claim 12 wherein the organic base is triethylamine.

14. The composition of claim 12 wherein the esterification temperature is about 100° C. to about 180° C.

15. The composition of claim 3 wherein the esterification temperature is a boiling temperature of a processing solvent.

16. The composition of claim 3 wherein the second reaction temperature is between about 25° C. to about 80° C.

17. The composition of claim 3 wherein Step A is carried out in the presence of an acid catalyst.

18. The composition of claim 3 wherein Step B is carried out in the presence of air.

19. The composition of claim 3 wherein Step B is carried out in the presence of hydroquinone monomethyl ether.

20. An acrylated maleic-modified rosin ester comprising: a maleic-modified rosin ester moiety having a predetermined number of acrylate moieties connected directly to the maleic-modified rosin ester moiety through an ester linkage, wherein a degree of esterification with regard to said ester linkage is about 30 equivalent % or more.

\* \* \* \* \*